United States Patent
Yamamoto et al.

(10) Patent No.: US 8,848,082 B2
(45) Date of Patent: Sep. 30, 2014

(54) IMAGE CAPTURING APPARATUS, INFORMATION PROCESSING METHOD AND STORAGE MEDIUM FOR ESTIMATING A POSITION OF A SOUND SOURCE

(75) Inventors: Hiroki Yamamoto, Yokohama (JP); Yasuo Okutani, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 550 days.

(21) Appl. No.: 12/625,441

(22) Filed: Nov. 24, 2009

(65) Prior Publication Data

US 2010/0134677 A1  Jun. 3, 2010

(30) Foreign Application Priority Data

Nov. 28, 2008  (JP) ................... 2008-304598

(51) Int. Cl.
*H04N 5/222* (2006.01)
*H04N 5/232* (2006.01)

(52) U.S. Cl.
CPC ....... *H04N 5/23293* (2013.01); *H04N 5/23245* (2013.01)
USPC .................................. 348/333.01; 348/231.4

(58) Field of Classification Search
None
See application file for complete search history.

(56) References Cited

U.S. PATENT DOCUMENTS

| 6,021,278 | A | * | 2/2000 | Bernardi et al. ................ 396/57 |
| 6,091,450 | A | * | 7/2000 | Hirasawa ................ 348/333.01 |
| 6,757,397 | B1 | * | 6/2004 | Buecher et al. ............... 381/122 |
| 2002/0048373 | A1 | * | 4/2002 | Paritsky et al. .................... 381/1 |
| 2005/0049864 | A1 | * | 3/2005 | Kaltenmeier et al. ........ 704/233 |
| 2005/0110874 | A1 | * | 5/2005 | Song ........................ 348/207.99 |
| 2005/0181820 | A1 | * | 8/2005 | Ono ........................... 455/550.1 |
| 2005/0264984 | A1 | * | 12/2005 | Lee ................................ 361/681 |
| 2007/0086764 | A1 | * | 4/2007 | Konicek ......................... 396/56 |
| 2009/0116658 | A1 | * | 5/2009 | An et al. ...................... 381/71.1 |
| 2009/0253463 | A1 | * | 10/2009 | Shin et al. ..................... 455/563 |

FOREIGN PATENT DOCUMENTS

| JP | 1983-137828 | 8/1983 | |
| JP | 2002111801 A | * 4/2002 | ............. H04M 1/00 |

* cited by examiner

*Primary Examiner* — Dennis Hogue
(74) *Attorney, Agent, or Firm* — Canon USA, Inc. IP Division

(57) ABSTRACT

An image capturing apparatus according to exemplary embodiments of the present invention includes a viewfinder and a display, switches between a display mode for displaying an image on the viewfinder, and a display mode for displaying an image on the display, sets processing of speech input to a mode for close-talking, when an image is displayed on the viewfinder, sets processing of speech input to a mode for non-close-talking, when an image is displayed on the display, and inputs by speech a control command that has been set in advance according to a mode of speech input that has been set.

10 Claims, 12 Drawing Sheets

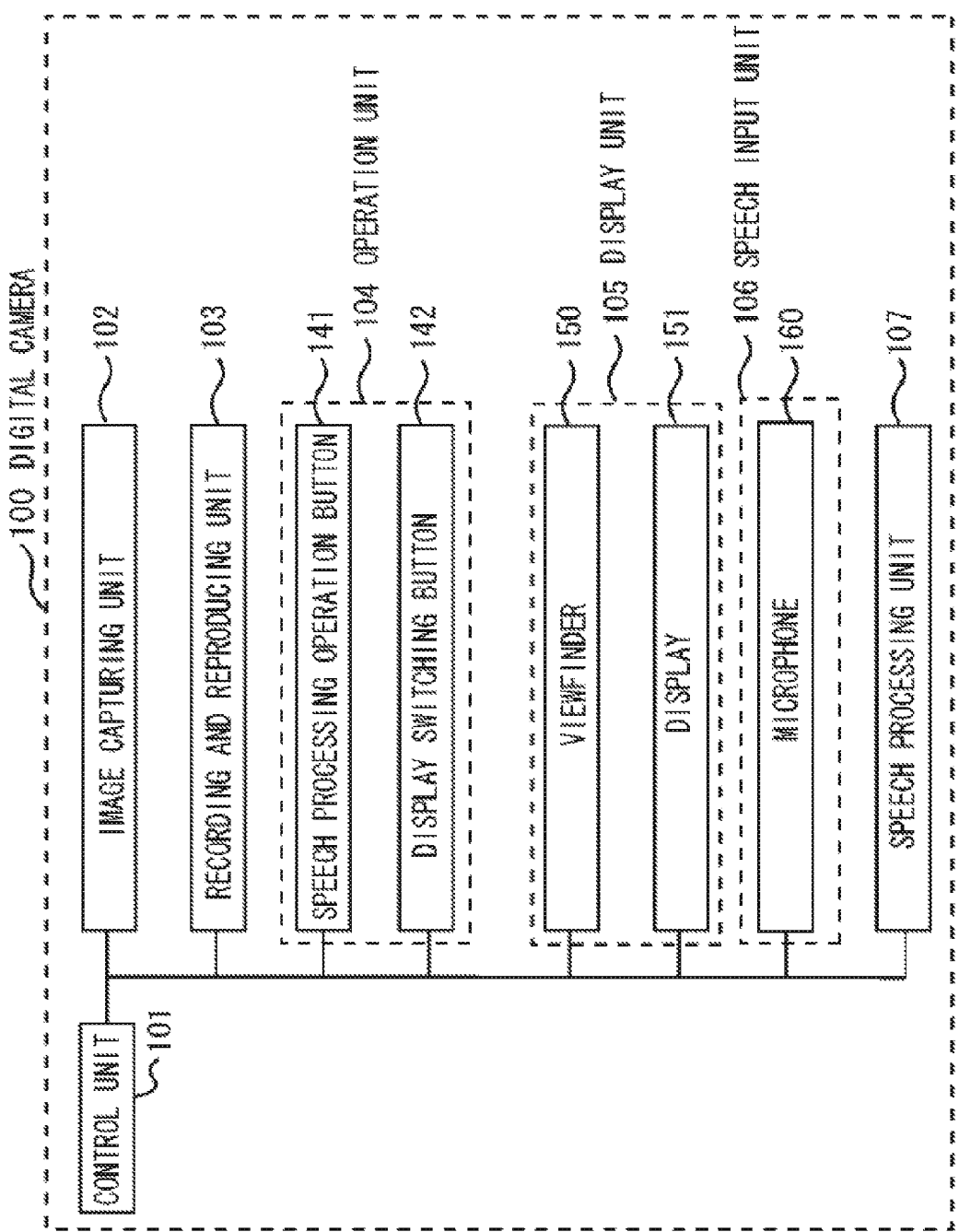

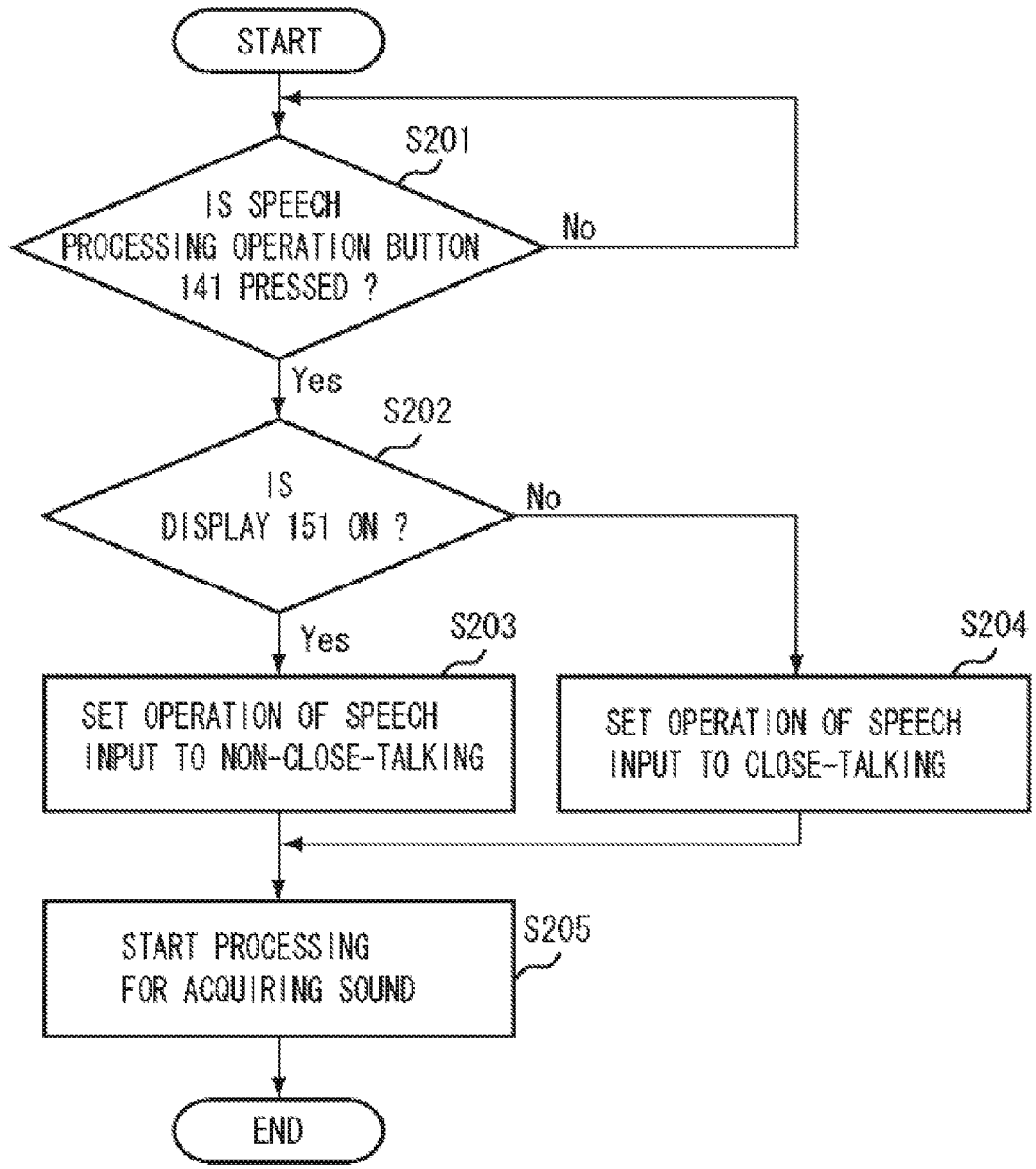

POSTURE WHEN OPERATING WHILE WATCHING DISPLAY

POSTURE WHEN OPERATING APPARATUS WHILE WATCHING VIEWFINDER

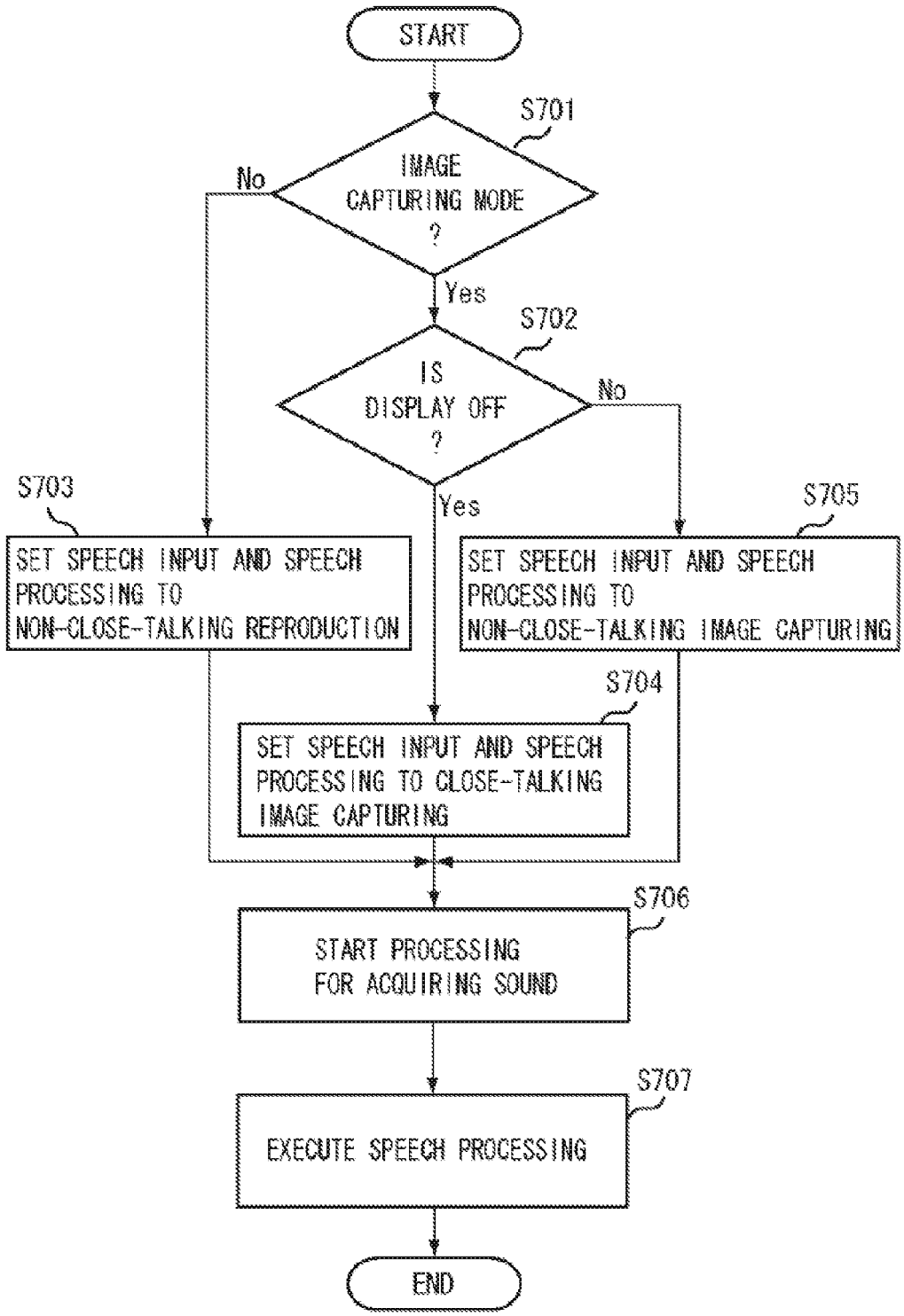

FIG. 8

| | DISPLAY OFF + IMAGE CAPTURING MODE (CLOSE-TALKING IMAGE CAPTURING) | DISPLAY ON + IMAGE CAPTURING MODE (NON-CLOSE-TALKING IMAGE CAPTURING) | DISPLAY ON + REPRODUCTION MODE (NON-CLOSE-TALKING REPRODUCTION) |
|---|---|---|---|
| "AUTOMATIC FLASH LIGHT EMISSION" | "AUTOMATIC FLASH LIGHT EMISSION" | | |
| "FLASH LIGHT EMISSION" | "FLASH LIGHT EMISSION" | | |
| "PROHIBIT FLASH LIGHT EMISSION" | "PROHIBIT FLASH LIGHT EMISSION" | | |
| "EXPOSURE CORRECTION, BRIGHT" | "EXPOSURE CORRECTION + 1" | | |
| "EXPOSURE CORRECTION, DARK" | "EXPOSURE CORRECTION - 1" | | |
| "EXPOSURE CORRECTION, BRIGHT" | "EXPOSURE CORRECTION + 1" | | |
| "EXPOSURE CORRECTION, DARK" | "EXPOSURE CORRECTION - 1" | | |
| "NORMAL SHOOTING" | "NORMAL SHOOTING" | | |
| "HUMAN SHOOTING" | "HUMAN SHOOTING" | | |
| "LANDSCAPE SHOOTING" | "LANDSCAPE SHOOTING" | | |
| "TIGHT CLOSE-UP SHOOTING" | "TIGHT CLOSE-UP SHOOTING" | | |
| "NIGHT SCENE SHOOTING" | "NIGHT SCENE SHOOTING" | | |
| "RECORDED IMAGE QUALITY L" | "RECORDED IMAGE QUALITY L" | | |
| "RECORDED IMAGE QUALITY M" | "RECORDED IMAGE QUALITY M" | | |
| "RECORDED IMAGE QUALITY S" | "RECORDED IMAGE QUALITY S" | | |
| "RECORDED IMAGE QUALITY RAW" | "RECORDED IMAGE QUALITY RAW" | | |
| "SINGLE SHOOTING" | "SINGLE SHOOTING" | | |
| "CONTINUOUS SHOOTING" | "CONTINUOUS SHOOTING" | | |
| "SELF-TIMER" | "SELF-TIMER" | | |

FIG. 8-CONTINUED

| | | | |
|---|---|---|---|
| "DISPLAY ON" | "DISPLAY ON + IMAGE CAPTURING MODE" | — | "DISPLAY ON + REPRODUCTION MODE" |
| "DISPLAY OFF" | — | "DISPLAY OFF + IMAGE CAPTURING MODE" | "DISPLAY ON + REPRODUCTION MODE" |
| "IMAGE CAPTURING MODE" | — | — | — |
| "REPRODUCTION MODE" | "DISPLAY ON + REPRODUCTION MODE" | "DISPLAY ON + REPRODUCTION MODE" | — |
| "IMAGE CAPTURING" | "IMAGE CAPTURING" | "IMAGE CAPTURING" | — |
| "ENLARGEMENT" | "ZOOM-IN (OPTICAL)" | "ZOOM-IN (OPTICAL OR DIGITAL)" | — |
| "REDUCTION" | "ZOOM-IN (OPTICAL)" | "ZOOM-IN (OPTICAL OR DIGITAL)" | — |
| "BRIGHTEN DISPLAY" | "BRIGHTNESS OF VIEWFINDER + 1" | "BRIGHTNESS OF DISPLAY + 1" | "BRIGHTNESS OF DISPLAY + 1" |
| "DARKEN DISPLAY" | "BRIGHTNESS OF VIEWFINDER − 1" | "BRIGHTNESS OF DISPLAY − 1" | "BRIGHTNESS OF DISPLAY − 1" |
| "NEXT IMAGE" | — | — | DISPLAY NEXT IMAGE |
| "PRECEDING IMAGE" | — | — | DISPLAY PRECEDING IMAGE |
| "SLIDE SHOW" | — | — | "SLIDE SHOW" |
| "REPRODUCTION" | — | — | "REPRODUCTION" |
| "TEMPORARY STOP" | — | — | "TEMPORARY STOP" |
| "STOP" | — | — | "STOP" |

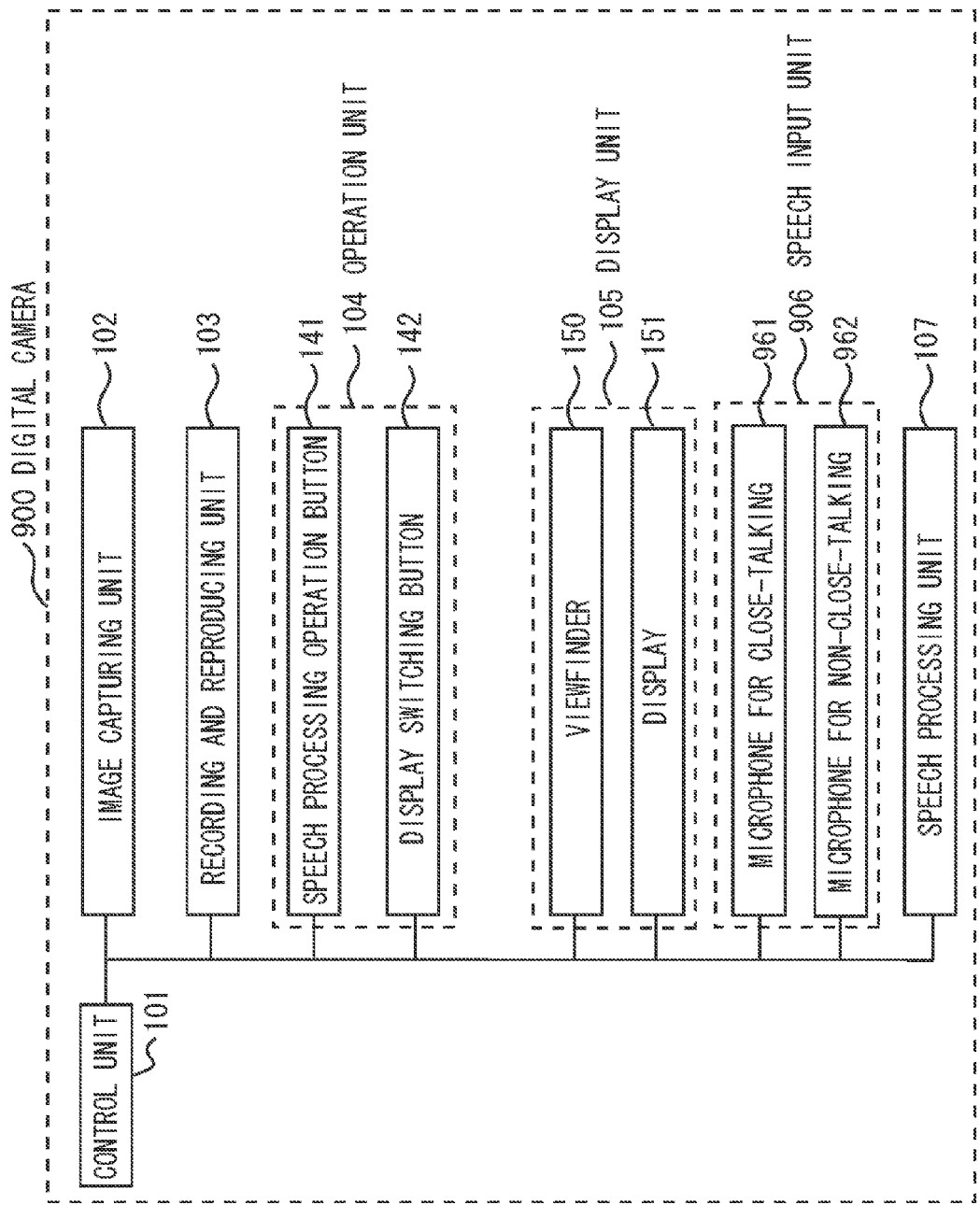

IMAGE CAPTURING APPARATUS, INFORMATION PROCESSING METHOD AND STORAGE MEDIUM FOR ESTIMATING A POSITION OF A SOUND SOURCE

BACKGROUND OF THE INVENTION

1. Field of the Invention

The present invention relates to a technique for estimating a position of a sound source, and switching between settings in relation to a speech input.

2. Description of the Related Art

Conventionally, a digital camera is equipped with a viewfinder used in peeping thereinto with either a right eye or a left eye, and a display used spaced apart from the eyes by a predetermined distance, facing straight ahead. Therefore, when capturing an image of an object utilizing the above-described digital camera, a user can perform an image capturing operation while peeping into the viewfinder, and also can perform the image capturing operation, while watching the display.

On the other hand, a digital camera equipped with a microphone exists. In addition, a technique for recording sounds input to the above-described microphone in association with captured images is known. Further, a technique for operating the digital camera using sounds input to the above-described microphone as a trigger.

Hereinbelow, capturing an image using the digital camera equipped with the microphone while inputting a speech will be described. In such a case, either the user can perform a speech input while peeping into the viewfinder, or the user can perform a speech input while watching the display. In other words, the distance between the microphone and the user's mouth which serves as a sound source is varied depending on the user's posture while maneuvering the camera. Consequently, sound volumes input to the microphone are not held constant.

In view of such a conventional technique, there is known a technique (e.g., Japanese Patent Application Laid-Open No. 1983-137828) for switching between sensitivities of the microphone, and allowing the user to switch between the sensitivities of the microphone to match the position of the sound source. However, it is inefficient to manually switch between the sensitivities of the microphone.

Further, in Japanese Patent Application Laid-Open No. 1983-137828, it is conceivable that without switching between sensitivities of a microphone, in a certain case, the user performs a speech input while peeping into a viewfinder, and in another case, performs the speech input while watching a display. At that time, a suitable speech input is only performed in one of the cases where the speech input is performed while peeping into the viewfinder, and where the speech input is performed while watching the display.

If the suitable speech input fails to be performed (for instance, an input sound volume may be too small, or too large), it is necessary to adjust an output sound volume in reproducing the recorded speech which has been input. Further, when speech recognition is performed on the speech which has been input, it contributes to a degradation of recognition accuracy. Further, if a user needs to manipulate a switch for switching between the sensitivities of the microphone, when capturing the image while performing the speech input, the user may lose a moment's shutter chance.

SUMMARY OF THE INVENTION

The present invention is directed to providing a technique for estimating a position of a mouth (sound source) when a user maneuvers a digital camera, and for suitably capturing sounds uttered from the estimated sound source. Further, the present invention is directed to inputting sounds with an appropriate sound volume, when processing of a recording or speech recognition is executed.

According to an aspect of the present invention, an image capturing apparatus including a viewfinder and a display includes a switching unit configured to switch between a display mode for displaying an image on the viewfinder, and a display mode for displaying an image on the display, a setting unit configured to set, when an image is displayed on the viewfinder, processing of speech input to processing for close-talking, and to set, when an image is display on the display, processing of speech input to processing for non-close-talking, and an input unit configured to perform speech input of a control command according to processing that has been set.

According to exemplary embodiments of the present invention, a position of a user's mouth (sound source) while maneuvering a digital camera can be estimated, and sounds uttered from the estimated sound source can be suitably captured. Further, when processing of recording or speech recognition is executed, sounds with an appropriate sound volume can be input.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a functional block diagram illustrating a digital camera which is an example of an image capturing apparatus according to a first exemplary embodiment.

FIG. 2 is a flowchart illustrating a flow of setting a speech input in a digital camera according to a first exemplary embodiment.

FIG. 7 is a flowchart illustrating processing for switching between recognition modes in a digital camera according to a third exemplary embodiment.

FIG. 8 illustrates a data table indicating a processing to be executed according to a control command which has been input by speech.

FIG. 9 is a functional block diagram illustrating a digital camera which is an example of an image capturing apparatus according to a fourth exemplary embodiment.

DESCRIPTION OF THE EMBODIMENTS

Figure 3A:
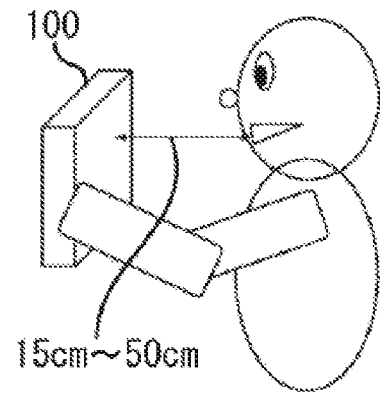
FIGS. 3A and 3B illustrate postures of a user while maneuvering a digital camera.

Various exemplary embodiments, features, and aspects of the invention will be described in detail below with reference to the drawings.

FIG. 1 is a functional block diagram illustrating a digital camera which is an example of an image capturing apparatus according to a first exemplary embodiment.

In FIG. 1, a digital camera 100 includes a control unit 101, an image capturing unit 102, a recording and reproducing unit 103, an operation unit 104, a display unit 105, a speech input unit 106, and a speech processing unit 107. The control unit 101 controls operations of the image capturing unit 102, the recording and reproducing unit 103, the operation unit 104, the display unit 105, the speech input unit 106, and the speech processing unit 107.

The controls in the control unit 101 will be described below. The control unit 101 includes a central processing unit (CPU), a read only memory (ROM), a random access memory (RAM), and the like.

The image capturing unit 102 generates an image signal of an image formed by a lens, and performs an analog/digital (A/D) conversion or the like on the generated image signal, and outputs a digital image signal (hereinafter, referred to as image data) to a recording medium. The image capturing unit 102 includes a lens, an image sensor such as a charge-coupled drive (CCD) or a complementary metal-oxide-semiconductor (CMOS), and an A/D conversion circuit.

The recording and reproducing unit 103 records image data in the recording medium. Further, the recording and reproducing unit 103 reads out image data recorded by the recording medium. In addition, the recording and reproducing unit 103 includes a recording medium such as a hard disk drive (HDD) or a flash memory, a recording control unit which records the image data in a storage medium, a reproduction control unit which reads out the image data from the recording medium, and the like.

The operation unit 104 is used when a user manually maneuvers the digital camera 100. The operation unit 104 includes a button, a switch, and the like.

Hereinbelow, an example of a button which constitutes the operation unit 104 will be described. The operation unit 104 includes a speech processing operation button 141, and a display switch button 142. When the user manipulates the speech processing operation button 141, the speech input unit 106 starts capturing of sounds, and the speech processing unit 107 executes recording, speech recognition and the like. When the user manipulates the display switch button 142, the display unit 105 switches to a display mode for displaying an image.

The details of the display mode will be described below. The display unit 105 includes the viewfinder 150, the display 151 such as a liquid crystal display (LCD), a thin-film transistor (TFT), and an organic electro luminescence (EL) display, and the like. The viewfinder 150, which is a known electronic viewfinder (EVF), is suitable for a user's eye access peeping thereinto with one eye to check an image and image capturing condition and the like. Further, the display 151 is suitable for the user to be separated therefrom by a predetermined distance (e.g., from 15 cm to about 50 cm) to check the image and the image capturing condition and the like.

The viewfinder 150 and the display 151 operate in three types of display modes as follows. A first display mode is a mode in which the viewfinder 150 displays an image and an image capturing condition and the like (ON), and the display 151 does not display anything (OFF). A second display mode is a mode in which the viewfinder 150 does not display anything (OFF), and the display 151 displays an image and an image capturing condition and the like (ON). A third display mode is a mode in which both the viewfinder 150, and the display 151 display an image and an image capturing condition and the like (ON). The above-described three display modes are switched, for instance, each time the user manipulates the display switch button 142, in the order of the first display mode, the second display mode, the third display mode, the first display mode, and so on.

The speech input unit 106 includes a microphone 160 and the like, and executes processing for capturing sounds. The speech processing unit 107 performs the recording, the speech recognition and the like on sounds captured by the speech input unit 106. When the speech processing unit 107 performs recording, it records the sounds captured by the recording and reproducing unit 103 in the recording medium. When the speech processing unit 107 performs the speech recognition, subsequent processing will be executed based on a result of the recognition.

Further, whether the recording or the speech recognition is to be executed is determined, for instance, in the following manner. Namely, when the user makes a long press of the speech processing operation button 141 (e.g., pressing time is one second or longer), the speech processing unit 107 executes recording. When the user makes a short press of the speech processing operation button 141 (e.g., pressing time is less than one second), the speech processing unit 107 executes the speech recognition.

Although the digital camera according to the present exemplary embodiment includes one speech processing operation button 141, it may include a recording button for executing the recording, and a speech recognition button for executing the speech recognition in place of the speech processing operation button 141.

Hereinbelow, switching between the settings of the operations of the speech input unit 106, the speech processing unit 107 and the like according to a display mode of the display unit 105 will be described.

FIG. 2 is a flowchart illustrating a flow of information processing for switching the processing of the speech input according to the display mode in the digital camera of the present exemplary embodiment.

In step S201, the control unit 101 determines whether the speech processing operation button 141 is pressed. If the speech processing operation button 141 is pressed (YES in step S201), the control unit 101 executes the processing of step S202. On the other hand, if the speech processing operation button 141 is not pressed (NO in step S201), the control unit 101 stands by until the speech processing operation button 141 is pressed.

In step S202, the control unit 101 determines whether an image or an image capturing condition is being displayed on the display 151. If the image or the image capturing condition is being displayed on the display 151 (YES in step S202), the control unit 101 executes the processing step S203. Namely, when a display mode of the display unit 105 is the second display mode or the third display mode, the control unit 101 executes the processing of step S203.

In step S203, the control unit 101 sets the operation of the speech input unit 106 to non-close-talking because, when the image and shooting condition are being displayed on the display 151, it is assumed that a user takes a posture of maneuvering the camera while watching the display 151. In other words, as shown in FIG. 3A, it is assumed that the user's face is located at a position a little apart from the display 151

(for instance, a spacing between the display 151 and the user's face (mouth) is from 15 cm to 50 cm).

Thus, the control unit 101 performs such a setting that suitably captures sounds uttered from a sound source located at a position a little apart from the speech input unit 106 (for instance, such a position that a spacing between the display 151 and the user's face (mouth) is from 15 cm to 50 cm).

Setting to non-close-talking in the speech input unit 106 will be described below. On the other hand, if an image or an image capturing condition is not displayed on the display 151 (NO in step S202), the control unit 101 executes the processing of step S204. Namely, if a display mode of the display unit 105 is the first display mode, the control unit 101 executes the processing of step S204.

Figure 3B:
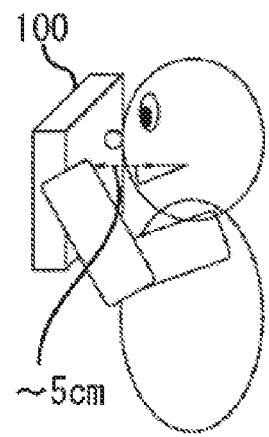

In step S204, the control unit 101 sets the operation of the speech input unit 106 to close-talking because, if an image or a shooting condition is displayed on the viewfinder 150, it is estimated that the user takes a posture of maneuvering the camera while watching the viewfinder 150. In other words, as shown in FIG. 3B, it is estimated that the user's face is at a position close to the viewfinder 150 (for instance, such a position that a spacing between the viewfinder 150 and the user's face (mouth) is equal to or less than 5 cm).

Thus, the control unit 101 performs such a setting that suitably captures sounds uttered from the sound source at a position close to the speech input unit 106 (for instance, such a position that a spacing between the viewfinder 150 and the user's face (mouth) is equal to or less than 5 cm). The setting to the close-talking in the speech input unit 106 will be described below.

Next in step S205, the speech input unit 106 starts capturing sounds. Hereinbelow, setting for the close-talking and setting for the non-close-talking in relation to the operation of the speech input unit 106 will be described for each setting item. First, the case of adjusting an input level of the speech input unit 106 will be described.

In the present exemplary embodiment, an input level is a value to be used for controlling a magnitude of a volume of sounds captured by the speech input unit 106. In the present exemplary embodiment, V1 is used as an input level for the close-talking, and V2 is used as an input level for the non-close-talking. Here, it is desirable to set V1 and V2 such that the sound volumes captured in the case where the speech is input in the close-talking, and the case where the speech is input in the non-close-talking become nearly the same. Namely, the input level V2 for the non-close-talking is set so as to amplify the sound to be greater than that of the input level V1 for the close-talking. For instance, a speech input device may be employed, in which input levels can be adjusted to 16 stages from 0 to 15 and the larger the numeral, the larger a sound volume of the captured sound. In such a case, V1 is set to 5, and V2 to 12.

Thus, in this manner, switching to the input level that reflects a posture of the user while maneuvering the camera can be achieved without manually switching between the input levels. More specifically, when the display 151 is ON, it is assumed that the user takes a posture a little apart from the camera, as shown FIG. 3A. In this case, the speech uttered from a distant place can be captured at appropriate sound volume by setting to the input level for the non-close-talking.

Further, when the display 151 is OFF, it is assumed that the user takes a posture with the camera close to his or her face in order to peep into the viewfinder 150. In this case, the speech uttered in the vicinity of the microphone can be captured at an appropriate sound volume by setting the input level to the close-talking. Therefore, without performing a manual operation, it is possible to collect sounds at an appropriate sound volume in the close-talking as well as the non-close-talking.

Next, setting directivities of the microphone 160 will be described. The user may take a posture of watching the display 151, as illustrated in FIG. 3A, or take a posture of peeping into the viewfinder 150, as illustrated in FIG. 3B. In respective cases, the positions estimated to be the user's mouth are different.

Figure 4A:
FIGS. 4A and 4B illustrate positions of sound sources when a user maneuvers a digital camera.

When the user is watching the display 151, the speech uttered by the user can be suitably captured, if the directivity of the microphone is narrow, as illustrated in FIG. 4A. Further, if the directivity of the microphone is narrow, there is also an advantage that sounds such as ambient noise other than the speech which the user has uttered are not easily collected.

Figure 4B:

On the other hand, when the user is peeping into the viewfinder 150, if the directivity of the microphone is wide, as illustrated in FIG. 4B, the speech which the user has uttered can be suitably captured. In this manner, without manually switching the directivities of the microphone, switching between the directivities of the microphone can be performed to reflect a posture of the user while maneuvering the camera. Namely, even if the speech is uttered from a distant position, without performing a manual operation, sounds showing less noise can be captured. Alternatively, if the directivity for the close-talking is set to a super-directivity, or a sharp-directivity, while the directivity for the non-close-talking is set to a single-directivity, or a non-directivity, a similar effect can be obtained.

Figure 5:
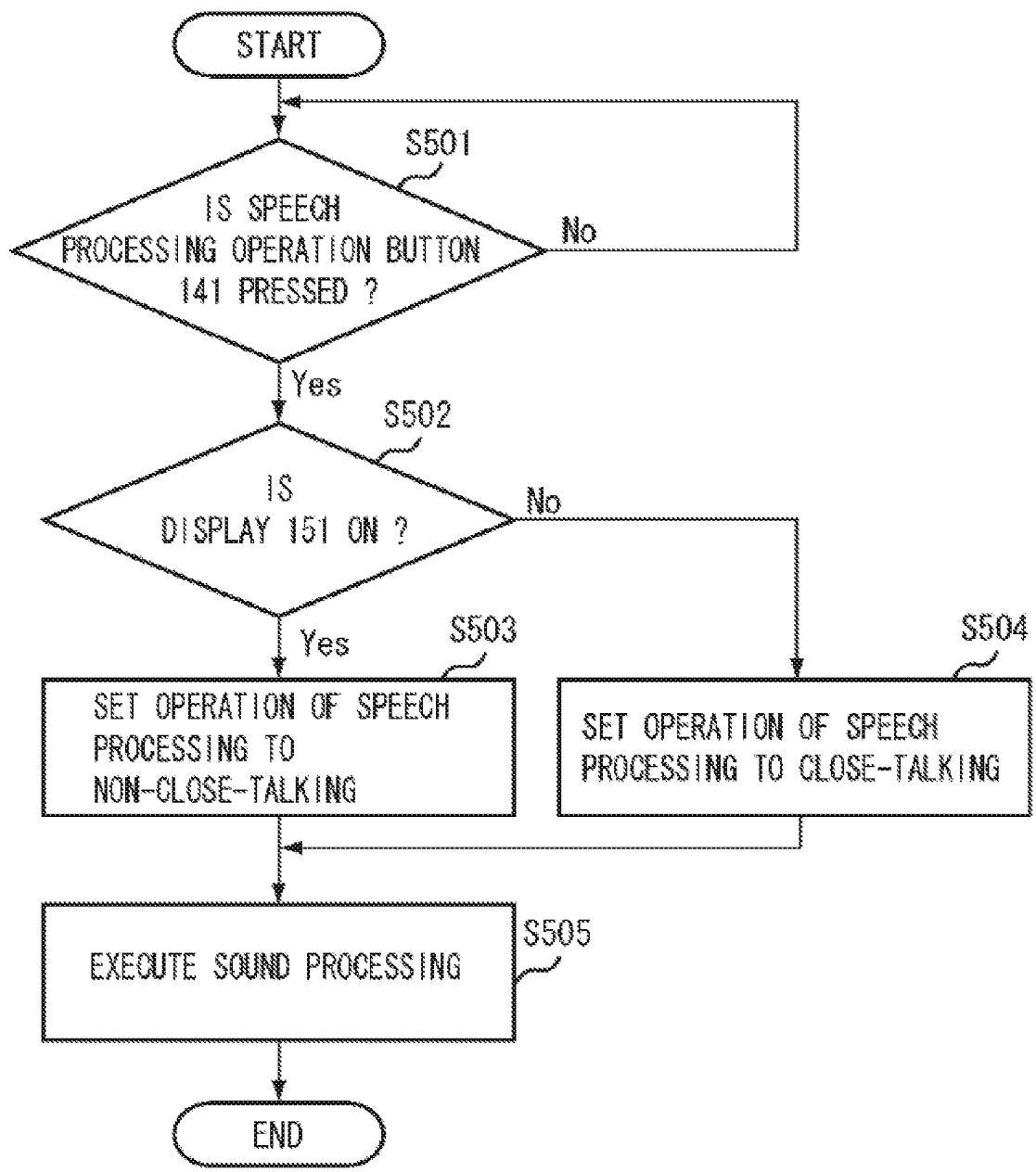
FIG. 5 is a flowchart illustrating a flow of setting a speech processing in a digital camera according to a first exemplary embodiment.

FIG. 5 is a flowchart illustrating processing of setting various parameters in relation to the speech processing based on the display modes in the digital camera according to the present exemplary embodiment.

In step S501, the control unit 101 determines whether the speech processing operation button 141 is pressed. If the speech processing operation button 141 is pressed (YES in step S501), the control unit 101 executes the processing of step S502. On the other hand, if the speech processing operation button 141 is not pressed (NO in step S501), the control unit 101 stands by until the speech processing operation button 141 is pressed.

In step S502, the control unit 101 determines whether an image or an image capturing condition is displayed on the display 151. If the images or the image capturing conditions are displayed on the display 151 (YES in step S502), the control unit 101 executes the processing of step S503.

In step S503, the control unit 101 sets the operation of the speech processing unit 107 to the non-close-talking. Namely, if the display mode of the display unit 105 is the second display mode or the third display mode, the control unit 101 executes the processing of step S503. On the other hand, if the image or the image capturing condition is not displayed on the display 151 (NO in step S502), the control unit 101 executes the processing of step S504.

In step S504, the control unit 101 sets the operation of the speech processing unit 107 to the close-talking. Namely, if the display mode of the display unit 105 is the first display mode, the control unit 101 executes the processing of step S504. Setting for the close-talking and setting for the non-close-talking in the speech processing unit 107 will be described below.

Next in step S505, the speech processing unit 107 executes the speech processing set in advance on sounds captured by the speech input unit 106. Hereinbelow, with respect to the setting for the close-talking and the setting for the non-close-talking in the speech processing unit 107, the case where the speech processing unit 107 performs the speech recognition processing will be described for each setting item.

First, an adjustment of an operation parameter of the speech recognition will be described. The operation parameter of the speech recognition is, for instance, a threshold value of voice activity detection. At this time, a threshold value TH1 for the close-talking is used as a setting for the close-talking, and a threshold value TH2 for the non-close-talking is used as a setting for the non-close-talking.

In the present exemplary embodiment, the threshold value TH2 for the non-close-talking is assumed to be a value at which a speech which is smaller than the threshold value TH1 for the close-talking can be detected. For instance, when a segment having a sound volume equal to or greater than the threshold value is detected as a speech segment based on a sound volume, TH1 is assumed to be 60 dBA, and TH2 is assumed to be 50 dBA.

In this manner, without manually switching the threshold values of the voice activity detection, a threshold value of the voice activity detection which reflects a posture of a user while maneuvering the camera can be set. Further, if the threshold values are switched in detecting the speech segment depending on the sound volume of the input speech, a recognition performance of the speech recognition can be generally enhanced as its effect, compared with a case using a single threshold value.

Next, switching between acoustic models to be used depending on the close-talking or the non-close-talking will be described. At this time, an acoustic model AM1 is used as an acoustic model for the close-talking, and an acoustic model AM2 is used as an acoustic model for the non-close-talking. For instance, the acoustic model AM1 is a model trained with training data of a large S/N ratio (signal-to-noise ratio) (e.g., 15 to 30 dB), and an acoustic model AM2 is a model trained with training data of a small S/N ratio (e.g., 0 to 15 dB).

In this manner, without manually switching between the acoustic models, an acoustic model which reflects a posture of the user while maneuvering the camera can be set. Further, the recognition performance of the speech recognition can be generally improved as its effect, compared with a case using the single acoustic model. Next, changing of a search condition of the speech recognition will be described.

In the processing of the speech recognition, known pruning processing for discarding a hypothesis that has been determined as unnecessary during the processing, is performed in order to speed up a search processing. A typical processing technique of the pruning is as follows. A value obtained by subtracting a specified value (beam width) from a hypothesis score that has the largest score is determined to be a threshold value, and computation of the hypothesis of less than the threshold value will not be performed thereafter. In other words, the computation is performed for only a hypothesis in which a difference from the maximum score is within a beam width.

However, it is well known that, with respect to such a threshold value in pruning, an optimum value is varied depending on noise environment during the speech input. If a speech that has been input contains a lot of noises, a score of a hypothesis, which represents input speech correctly, becomes small during the process of search. For this reason, if a pruning condition is severe (beam width is small in the above-described example), even a hypothesis that represents input speech correctly is eventually discarded in the process of search, and thus a recognition performance is degraded.

On the other hand, if the pruning condition is made loose (beam width is large in the above-described example) to match an environment having a lot of noises, the computation of unnecessary hypothesis occurs in an environment having less noise. Therefore, it is desirable to appropriately set the pruning threshold value by reflecting ambient noises.

In consideration of the above, in the present exemplary embodiment, a condition C1 is used as a search condition for the close-talking in which S/N ratio is high since a voice is uttered near the microphone. On the other hand, a condition C2 which is looser than the condition C1 is used as a search condition for the non-close-talking in which the S/N ratio is low. For instance, in an example in which the above-described beam width is used, a beam width of the condition C1 is set to a value which is larger than a beam width of the condition C2.

Further, as an another example, a histogram pruning technique for pruning hypotheses other than top N-hypotheses starting from the highest score during the process of search may be applied to the search processing of the speech recognition. In such a case, for instance, N=500 is used for the condition C1, and N=1000 is used for the condition C2. The search condition of the condition C2, in which a number of hypotheses to be left in the pruning is greater, is looser than that of the condition C1.

In this manner, without manually switching the search condition of the speech recognition, an appropriate search condition that reflects a posture of the user while maneuvering the camera can be set. Further, the recognition performance of the speech recognition can be enhanced as its effect, compared with a case using a single search condition.

Figure 6:
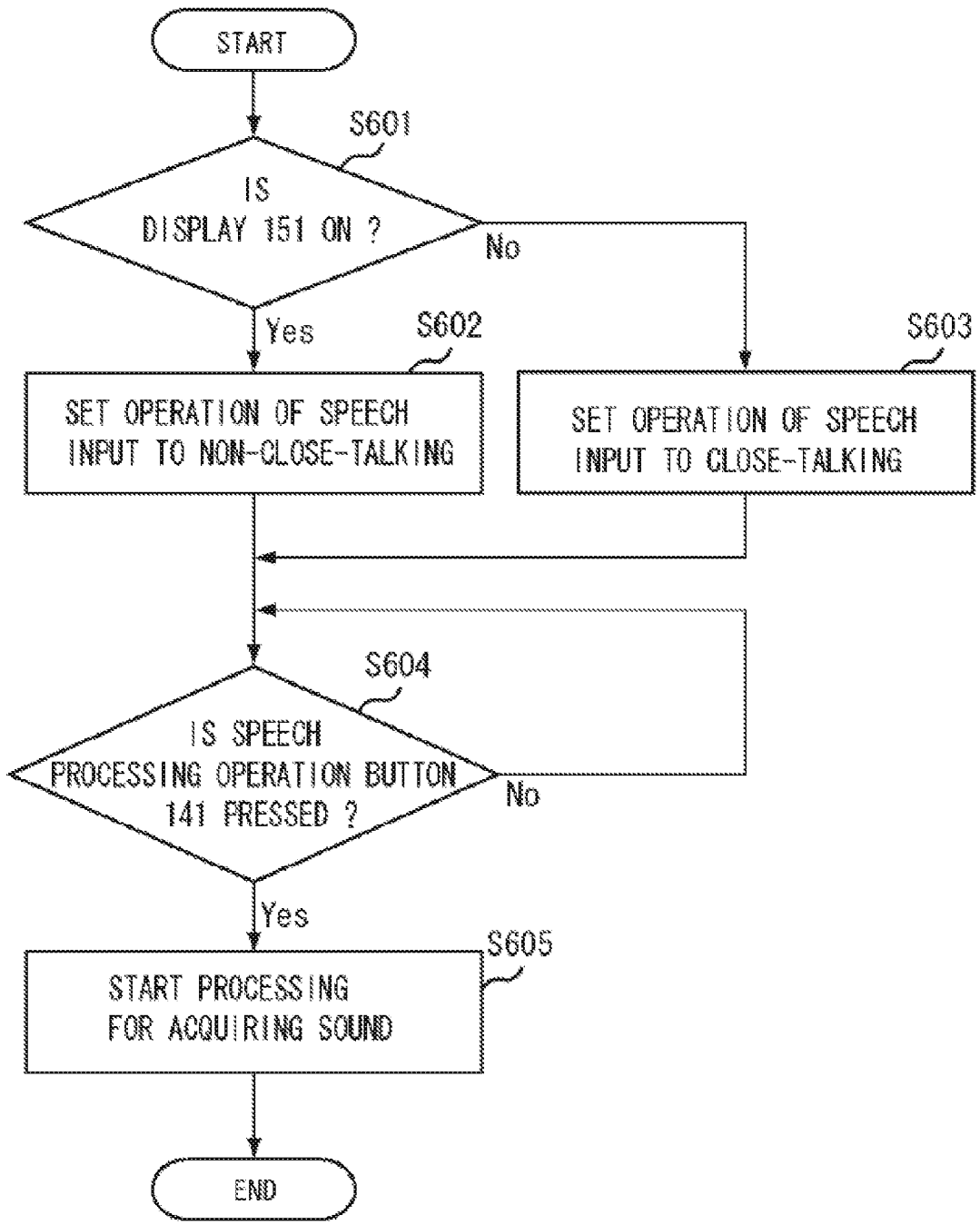
FIG. 6 is a flowchart illustrating a modified example of a flow of setting a speech input.

FIG. 6 is a flowchart illustrating an example of variation of the processing for switching the operations of the speech input unit 106 in the digital camera according to the present exemplary embodiment.

In step S601, the control unit 101 determines whether an image or an image capturing condition is displayed on the display 151. If the image or the image capturing condition is displayed on the display 151 (YES in step S601), the control unit 101 executes the processing in step S602.

In step S602, the control unit 101 sets the operation of the speech processing unit 107 to the non-close-talking. On the other hand, if the image or the image capturing condition is not displayed on the display 151 (NO in step S601), the control unit 101 executes the processing of step S603.

In step S603, the control unit 101 sets the operation of the speech processing unit 107 to the close-talking.

In step S604, the control unit 101 determines whether the speech processing operation button 141 is pressed. If the speech processing operation button 141 is pressed (YES in step S604), the control unit 101 executes the processing of step S605. On the other hand, if the speech processing operation button 141 is not pressed (NO in step S604), the control unit 101 stands by until the speech processing operation button 141 is pressed.

The control unit 101, if such processing is executed, sets the operation of the speech processing unit 106 in advance of the speech processing, when a display mode of the display unit 150 has changed. Therefore, when the user presses the speech processing button 141, the speech processing unit 106 can simultaneously start appropriate speech processing that reflects a posture of the user while maneuvering the camera.

In the processing of FIG. 6, an order of the processing between step S501 and steps from S502 to S504 of FIG. 5 are exchanged. An order of the processing in the speech processing unit 107 illustrated in FIG. 2 may also be exchanged in a similar manner.

In a second exemplary embodiment, the digital camera will be described, which is provided with a mode switching button in the operation unit 104. The mode switching button switches the operations of the digital camera between the image capturing mode and the reproduction mode (not illustrated).

In the digital camera according to the present exemplary embodiment, when the user manipulates the mode switching button, the control unit 101 switches the operations of the digital camera to a known image capturing mode (a mode for capturing an image), a reproduction mode (a mode for reproducing an image stored within the camera) and the like.

In the present exemplary embodiment, in the case of the image capturing mode, the speech input unit 106 sets the speech processing unit 107 to the close-talking. In the case of the reproduction mode, the speech input unit 106 sets the speech processing unit 107 to the non-close-talking. Namely, processing for determining whether a mode of the operation of the digital camera is the image capturing mode is performed in place of the processing of step S501 of FIG. 5, and the processing of step S601 of FIG. 6.

For instance, in some models of a digital single-lens reflex camera, the image capturing may be performed while the use peeps into the viewfinder to recognize the object. On the other hand, when reproduction of an image is performed using the digital single-lens reflex camera, the user confirms the image while watching a display. Namely, in the image capturing mode, when the user performs the speech input, the sound source is positioned close (it is assumed to be a few centimeters) to the digital single-lens reflex camera body.

On the other hand, in the reproduction mode, when the user performs the speech input, the sound source is positioned to have a given distance (it is assumed to be about tens centimeters) from the digital single-lens reflex camera body. Therefore, suitable speech input, and the speech processing can be set to the position of the sound source estimated from the user's posture while maneuvering the camera.

In a third exemplary embodiment, setting of suitable operations of the speech input unit 106 and the speech processing unit 107 will be described. The setting is made depending on the operation of the digital camera and the user's posture while maneuvering the digital camera.

In the digital camera according to the present exemplary embodiment, when the user manipulates a mode switching button, the control unit 101 switches the operation of camera to either the image capturing mode or the reproduction mode (first switching). Furthermore, in the image capturing mode, when the user manipulates the display switching button 142, the control unit 101 furthermore switches the display between ON and OFF states (second switching).

The digital camera according to the present exemplary embodiment provides a technique for estimating the position of the user's mouth (sound source) when he or she maneuvers the digital camera, and suitably capturing sounds uttered from the estimated sound source. In addition, the digital camera can capture sounds with an appropriate sound volume when executing the processing of the speech recognition. Furthermore, the digital camera can efficiently determine a control command which is input by speech depending on a situation of the image capturing, the reproduction or the like.

To achieve the above-described techniques, the digital camera according to the present exemplary embodiment has three recognition modes described below. A first recognition mode is a mode for suitably capturing a speech which has been input, and recognizing captured speech, when an image is captured while peeping into the viewfinder. A second recognition mode is a mode for suitably capturing a speech which has been input, and recognizing captured speech, when an image is captured while watching the monitor display. A third recognition mode is a mode for suitably capturing a speech which has been input, when an image is displayed and reproduced on the display, and recognizing captured speech.

FIG. 7 is a flowchart illustrating processing of switching between respective recognition modes, in the digital camera according to the present exemplary embodiment.

In step S701, the control unit 101 determines whether a recognition mode is the image capturing mode. If the recognition mode is the image capturing mode (YES in step S701), the control unit 101 executes the processing of step S702. On the other hand, if the recognition mode is not the image capturing mode (reproduction mode) (NO in step S701), then in step S703, the control unit 101 sets the recognition mode to the non-close-talking reproduction. The details of the recognition mode for the non-close-talking reproduction will be described below.

Further, in step S702, the control unit 101 determines whether the display 151 is OFF. If the display 151 is OFF (YES in step S702), the control unit 101 executes the processing of step S704. If the display 151 is ON (NO in step S702), the control unit 101 executes the processing of step S705.

In step S704, the recognition mode is set to the close-talking image capturing. The recognition mode for close-talking image capturing will be described below.

Further, in step S705, the recognition mode is set to the non-close-talking image capturing. The details of the recognition mode for the non-close-talking image capturing will be described below.

Next in step S706, the speech input unit 106 starts processing for capturing sounds.

Next in step S707, the speech processing unit 107 executes processing of the speech recognition set in advance on the sounds which the speech input unit 106 has captured.

Hereinbelow, the recognition modes for the close-talking image capturing, the non-close-talking image capturing, and the non-close-talking reproduction will be described. The three recognition modes are classified into the close-talking and the non-close-talking. Then, an input level, a directivity, a threshold value in detecting speech segment, an acoustic model, a search condition and the like are set according to the classification, similarly to the first exemplary embodiment. For instance, if the recognition mode is for the non-close-talking image capturing, an input level, a directivity, a threshold value in detecting a speech segment, an acoustic model, a search condition and the like are set to the non-close-talking.

Furthermore, the digital camera according to the present exemplary embodiment is characterized in that the processing to be executed is changed according to the control command which has been input by speech for each of the three recognition modes.

FIG. 8 illustrates a data table indicating the processing to be executed according to the control command which has been input by speech. In the present exemplary embodiment, in the case of the close-talking image capturing, a variety of control in relation to setting of the image capturing and equipment can be input by the speech of the control command.

Further, in the case of the non-close-talking image capturing, limited control in relation to a setting of the image capturing and equipment can be executed by speech input of the control command. This is because control in relation to a setting of the image capturing and the equipment can be executed also by a manual operation input, instead of the speech input. In the case of the non-close-talking image capturing, which is susceptible to an ambient noise, if recognizable control commands are limited, accuracy of the speech recognition is enhanced.

Further, in the case of the non-close-talking reproduction, limited control of a setting of reproduction and the equipment can be executed by speech input of the control command. With this configuration, accuracy of the speech recognition is also enhanced in the case of the non-close-talking reproduction, similarly to the non-close-talking image capturing. Further, in the reproduction mode, a speech may be output from the digital camera. Therefore, in the case of the non-close-talking reproduction, it is advisable to set only the control command to enable speech recognition.

In the first exemplary embodiment, and the second exemplary embodiment, the digital camera is described which switches settings of the speech input unit 106 and the speech processing unit 107, when the operation unit 104 is operated.

On the other hand, in a fourth exemplary embodiment, a known sensor which detects a user's line of sight is equipped in the viewfinder 150. In the digital camera according to the present exemplary embodiment, if the sensor senses the line of sight, the operations of the speech input unit 106 and the speech processing unit 107 are set to the close-talking. If the sensor has not sensed the line of sight, the operations of the speech input unit 106 and the speech processing unit 107 are set to the non-close-talking.

Namely, in place of the processing of step S202 of FIG. 2, the processing of step S502 of FIG. 5, and the processing of step S601 of FIG. 6, the processing is executed to determine whether the sensor has sensed a line of sight. In this manner, according to a positional relationship between the user's mouth (sound source) and the microphone 160, switching between settings of the operations of the speech input unit 106 and the speech processing unit 107 can be performed.

FIG. 9 is a functional block diagram illustrating the digital camera which is an example of the image capturing apparatus according to the fourth exemplary embodiment. In FIG. 9, elements corresponding to those illustrated in FIG. 1 are designated the same reference numerals as those in FIG. 1, and descriptions thereof will be omitted. In FIG. 9, the digital camera 900 includes the control unit 101, the image capturing unit 102, the recording and reproducing unit 103, the operation unit 104, the display unit 105, a speech input unit 906, and the speech processing unit 107.

The speech input unit 906 includes a close-talking microphone 961, a non-close-talking microphone 962 and the like. The close-talking microphone 961 is a microphone suitable for capturing sounds uttered from the sound source which is positioned at a short distance (e.g., within 10 cm) from the microphone. This is because, in a case where the user utters a voice while peeping into the viewfinder 150, a distance between the use's mouth (sound source) and the digital camera 900 is a few centimeters.

Further, the close-talking microphone 961 may be provided around the user' mouth, when the user peeps into the viewfinder 150. With this configuration, voices which the user intentionally utters can be captured with good efficiency.

Further, the close-talking microphone 961 may be the one which has directivity towards a place where the user's mouth is positioned when the user peeps into the viewfinder 150. With this configuration, even if a manner that the user peeps into the viewfinder 150 is changed, without changing the position at which the close-talking microphone 961 is provided, a voice which the user intentionally utters can be captured with good efficiency.

Further, the non-close-talking microphone 962 can suitably capture sounds when the close-talking is not performed, for instance, when the user utters a voice while holding the digital camera 900 by hand and watching the display 151. This is because, when the user utters a voice while holding the digital camera 900 by hand and watching the display 151, a microphone which can suitably capture sounds output from a sound source which is an arm's length away from the microphone is useful. Further, since the digital camera and the user are facing straight ahead each other, it is desirable to use a microphone which has superior directivity in a direction of a camera back face.

Figure 10A:
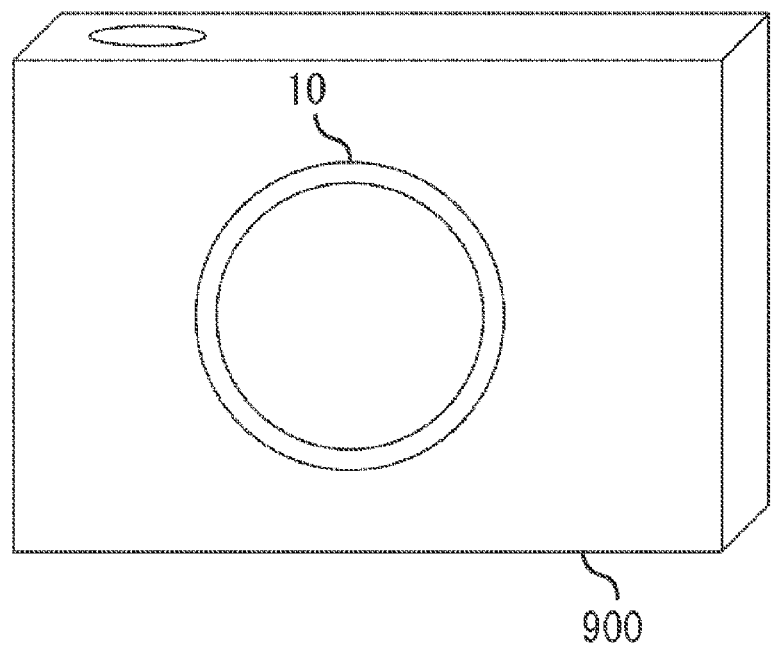
FIGS. 10A and 10B illustrate appearances of a digital camera according to a fourth exemplary embodiment.
Figure 10B:
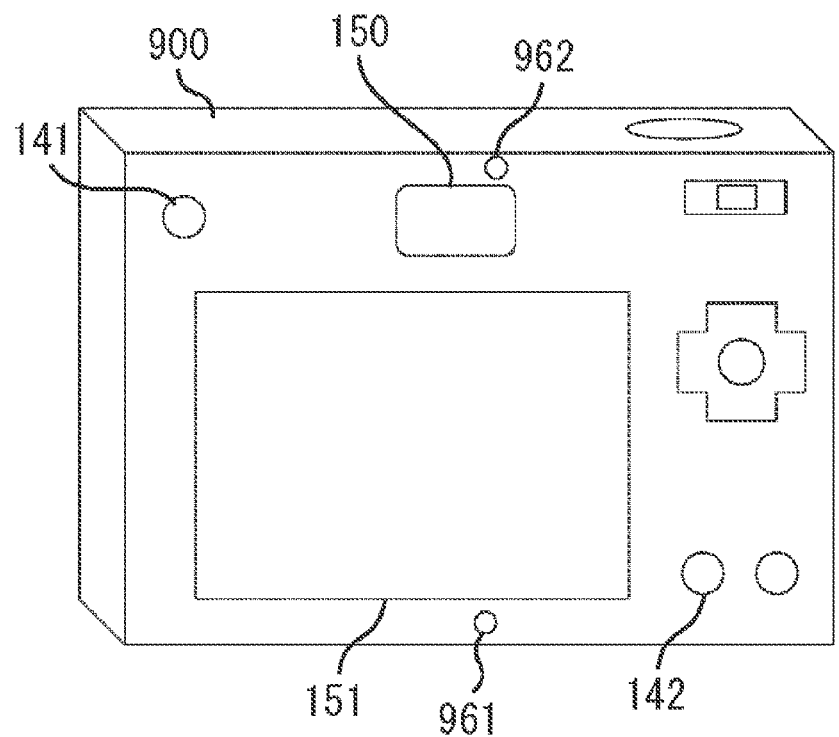

FIG. 10 illustrates an appearance of the digital camera 900 according to the present exemplary embodiment. FIG. 10A is a front face of the digital camera 900, and FIG. 9B is a back face of the digital camera 900. In FIG. 9, elements corresponding to those illustrated in FIG. 1 are designated the same reference numerals as those in FIG. 1, respectively, and descriptions thereof will be omitted.

Figure 11:
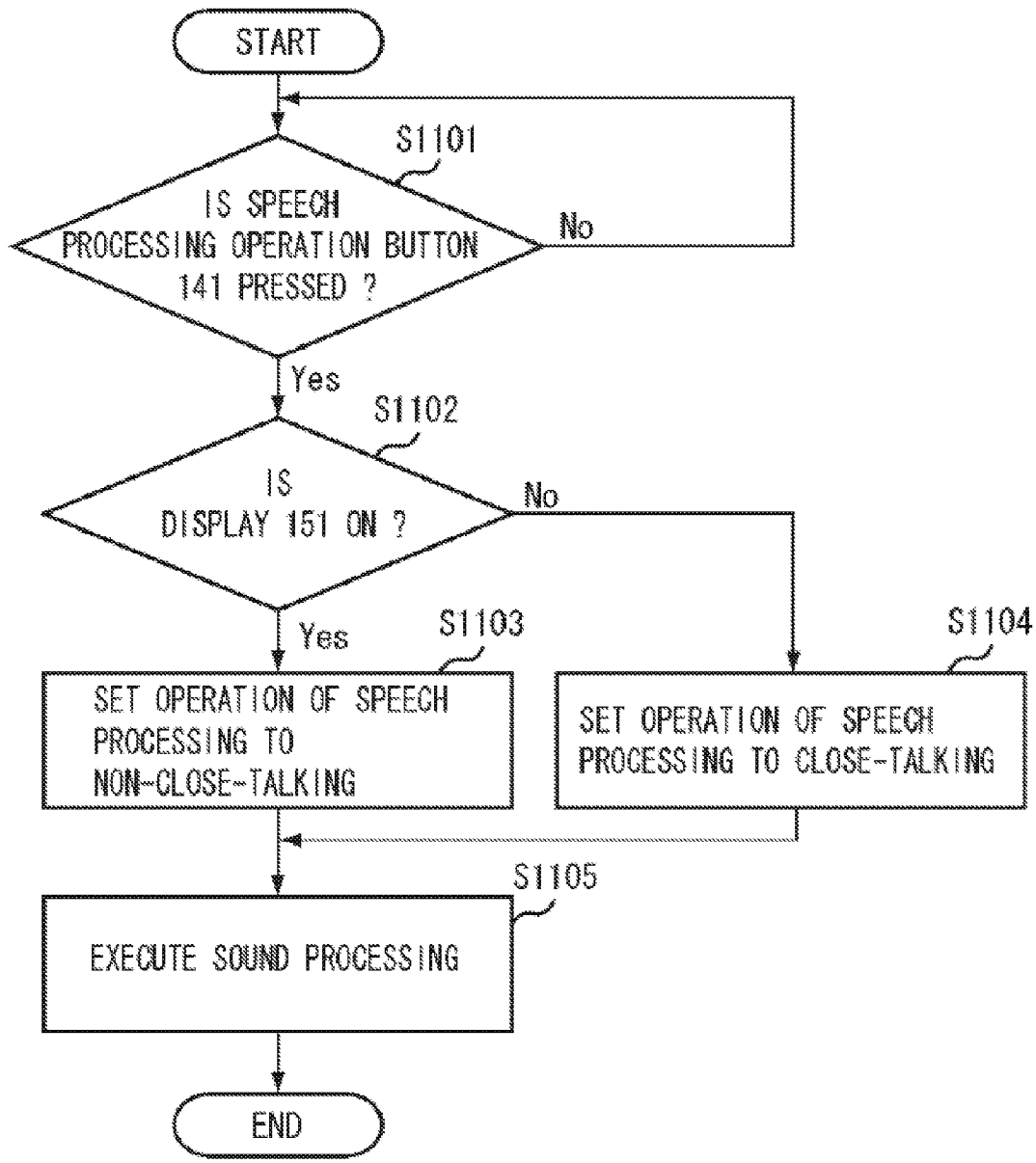
FIG. 11 is a flowchart illustrating a flow of determining a microphone which performs a speech input in a digital camera according to a fourth exemplary embodiment.

FIG. 11 is a flowchart illustrating a flow of setting processing of the speech input in a display mode, in the digital camera according to the present exemplary embodiment.

In step S1101, the control unit 101 determines whether the speech processing operation button 141 is pressed. If the speech processing operation button 141 is pressed (YES in step S1101), the control unit 101 executes the processing of step S1102. On the other hand, if the speech processing operation button 141 is not pressed (NO in step S1101), the control unit 101 stands by until the speech processing operation button 141 is pressed.

In step S1102, the control unit 101 determines whether an image or an image capturing condition is displayed on the display 151. If the image or the image capturing condition is displayed on the display 151 (YES in step S1102), the control unit 101 executes the processing of step S1103. Namely, if a display mode of the display unit 105 is a second display mode or a third display mode, the control unit 101 executes the processing of step S1103.

In step S1103, the control unit 101 makes a setting to collect sounds using the non-close-talking microphone 962. On the other hand, if the image or the image capturing condition is not displayed on the display 151 (NO in step S1102), the control unit 101 executes the processing of step S1104. Namely, if a display mode of the display unit 105 is a first display mode, the control unit 101 executes the processing of step S1104.

In step S1104, the control unit 101 sets the speech processing to collect sounds using the close-talking microphone 961. Next in step S1105, the speech input unit 106 starts a sound capturing operation.

A fifth exemplary embodiment is characterized in that, a plurality of microphones are arranged on a camera to constitute a microphone array, and sound source estimation and noise suppression processing are performed by the speech processing unit 107, to enhance sound quality of an input speech. Further, in the fourth exemplary embodiment, the microphone array may be used for the close-talking microphone, and the non-close-talking microphone.

However, various processing by the microphone array generally increases a processing amount. As a result, if a processing capability of the image capturing apparatus is poor, they may be configured such that the microphone array is applied only at the time of a speech input for the non-close-talking, in which an input sound quality is deteriorated. Namely, if a display mode of the display unit 150 is the first display mode, in other words if the user takes a posture of maneuvering while peeping into the viewfinder, the user and the microphone of the camera come close to each other, thereby attaining relatively good speech input environment. Thus, the control unit 101 makes a setting for the speech input by a single close-talking microphone.

On the other hand, if a display mode of the display unit 150 is set to the second display mode or the third display mode, the control unit 101 makes a non-close-talking setting, that is, makes a setting for the speech input in which the microphone array is applied. With this configuration, load of the processing in the image capturing apparatus can be reduced as its effect, while keeping a good speech input environment.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-304598 filed Nov. 28, 2008, which is hereby incorporated by reference herein in its entirety.

What is claimed is:

1. An image capturing apparatus including a viewfinder, a display, and at least one microphone, the image capturing apparatus comprising:
a switching unit configured to switch a display mode for displaying an image on the viewfinder and a display mode for displaying an image on the display;
a setting unit configured to set, in response to the display mode for displaying an image on the viewfinder being set, an input level of the at least one microphone to V1 for capturing sounds uttered from a user by estimating that the user's mouth is located at a position close to the at least one microphone, and to set, in response to the display mode for displaying an image on the display being set, the input level of the at least one microphone to V2 for capturing sounds uttered from the user by estimating that the user's mouth is located at a position a little apart from the at least one microphone; and
an input unit configured to input by speech a control command based on the set input level,
wherein a value of V2 is larger than a value of V1.

2. The image capturing apparatus according to claim 1, further comprising:
a determination unit configured to determine processing of speech recognition as processing for close-talking when the display mode for displaying an image on the viewfinder is set, and determine processing of speech recognition as processing for non-close-talking when the display mode for displaying an image on the display is set; and
a speech recognition unit configured to recognize the control command that has been input by speech, according to the determined processing of speech recognition.

3. The image capturing apparatus according to claim 2, wherein the processing of speech recognition for the non-close-talking is processing more suitable for an environment having a lot of noises than the processing for speech recognition for the close-talking.

4. The image capturing apparatus according to claim 1, wherein the viewfinder and the display are placed in the same surface.

5. The image capturing apparatus according to claim 1, wherein the viewfinder, the display, and the at least one microphone are placed in the same surface.

6. The image capturing apparatus according to claim 1, further comprising: a plurality of microphones, wherein the plurality of microphones are placed in the same surface.

7. An information processing method of an image capturing apparatus including a viewfinder, a display, and at least one microphone, comprising:
switching a display mode for displaying an image on the viewfinder and a display mode for displaying an image on the display;
setting, in response to setting the display mode for displaying an image on the viewfinder, an input level of the at least one microphone to V1 for capturing sounds uttered from a user by estimating that the user's mouth is located at a position close to the at least one microphone, and setting, in response to setting the display mode for displaying an image on the display, the input level of the at least one microphone to V2 for capturing sounds uttered from the user by estimating that the user's mouth is located at a position a little apart from the at least one microphone; and
inputting by speech a control command based on the set input level,
wherein a value of V2 is larger than a value of V1.

8. The information processing method according to claim 7, further comprising:
determining processing of speech recognition as processing for close-talking when the display mode for displaying an image on the viewfinder is set, and determining processing of speech recognition as processing for non-close-talking when the display mode for displaying an image on the display is set; and
recognizing the control command that has been input by speech, according to the determined processing of speech recognition.

9. The information processing method according to claim 8, wherein the processing of speech recognition for the non-close-talking is processing more suitable for an environment having a lot of noises than the processing for speech recognition for the close-talking.

10. A non-transitory storage medium that has stored a program for causing a computer to execute an information processing method according to claim 7.

* * * * *